United States Patent
Rajaraman et al.

(10) Patent No.: US 10,941,257 B2
(45) Date of Patent: Mar. 9, 2021

(54) VERSATILE COLOR CONCENTRATE FOR CLEAR POLYMERS

(71) Applicant: Chroma Color Corporation, Lambertville, NJ (US)

(72) Inventors: Hari Rajaraman, Woodstock, GA (US); Jeffrey S. Smink, Rockwell, NC (US); Bryan Ball, Delaware, OH (US)

(73) Assignee: Chroma Color Corporation, Lambertville, NJ (US)

( * ) Notice: Subject to any disclaimer, the term of this patent is extended or adjusted under 35 U.S.C. 154(b) by 24 days.

(21) Appl. No.: 16/336,284

(22) PCT Filed: Sep. 26, 2016

(86) PCT No.: PCT/US2016/053729
§ 371 (c)(1),
(2) Date: Mar. 25, 2019

(87) PCT Pub. No.: WO2018/057033
PCT Pub. Date: Mar. 29, 2018

(65) Prior Publication Data
US 2019/0211160 A1  Jul. 11, 2019

(51) Int. Cl.
| | | |
|---|---|---|
| *C08K 5/20* | (2006.01) | |
| *C08K 5/41* | (2006.01) | |
| *C08L 67/02* | (2006.01) | |
| *C08L 59/00* | (2006.01) | |
| *C08K 5/05* | (2006.01) | |
| *C08K 13/02* | (2006.01) | |
| *C08J 3/22* | (2006.01) | |
| *C08K 5/00* | (2006.01) | |
| *C08L 69/00* | (2006.01) | |

(52) U.S. Cl.
CPC ............ *C08J 3/226* (2013.01); *C08K 5/0041* (2013.01); *C08K 5/20* (2013.01); *C08L 67/02* (2013.01); *C08L 69/00* (2013.01); *C08J 2367/02* (2013.01); *C08J 2369/00* (2013.01); *C08J 2467/00* (2013.01); *C08K 5/005* (2013.01); *C08K 13/02* (2013.01)

(58) Field of Classification Search
CPC .... C08J 3/226; C08J 2367/02; C08J 2369/00; C08J 2467/00; C08K 5/0041; C08K 5/20; C08K 5/005; C08K 13/02; C08L 67/02; C08L 69/00
USPC .......................................................... 524/90
See application file for complete search history.

(56) References Cited

U.S. PATENT DOCUMENTS

| | | |
|---|---|---|
| 5,686,515 A | 11/1997 | Philips et al. |
| 6,469,083 B1 | 10/2002 | Opalko |
| 6,846,440 B2 * | 1/2005 | Flynn .......................... C08J 5/18 264/132 |
| 2002/0143090 A1 | 10/2002 | Pecorini et al. |
| 2003/0045611 A1 | 3/2003 | Agarwal et al. |
| 2008/0085959 A1 | 4/2008 | Mueller et al. |
| 2009/0220715 A1 | 9/2009 | Werink et al. |
| 2012/0263918 A1 | 10/2012 | Cuillery et al. |
| 2016/0017115 A1 | 1/2016 | Fatta |

FOREIGN PATENT DOCUMENTS

| | | |
|---|---|---|
| CN | 102585450 | 7/2012 |
| JP | 2002179891 | 6/2002 |

OTHER PUBLICATIONS

Patent Cooperation Treaty (PCT), International Search Report and Written Opinion for Application PCT/US2016/053729 filed Sep. 26, 2016, dated Dec. 27, 2016, International Searching Authority, US.
European Patent Office, Extended European Search Report for EU App. No. 16916999.2, dated May 4, 2020, 7 pages.

* cited by examiner

*Primary Examiner* — William K Cheung
(74) *Attorney, Agent, or Firm* — McDonald Hopkins LLC

(57) ABSTRACT

A color concentrate comprising a high molecular weight thermoplastic saturated polyester resin carrier that can be used in the manufacturing of colored clear plastics.

9 Claims, No Drawings

VERSATILE COLOR CONCENTRATE FOR CLEAR POLYMERS

CROSS-REFERENCE TO RELATED APPLICATION

This application is a 35 U.S.C. 371 national stage filing of PCT Application No. PCT/US2016/053729 filed on Sep. 26, 2016, entitled "VERSATILE COLOR CONCENTRATE FOR CLEAR POLYMERS," which is incorporated herein in its entirety by reference.

FIELD OF THE INVENTION

This invention relates to a color concentrate comprising a high molecular weight thermoplastic saturated polyester resin carrier that can be used in the manufacturing of colored clear plastics.

BACKGROUND

Clear plastics are used in a wide variety of applications such as packaging, lighting and electrical enclosures, automotive lens covers, instrument panel covers, appliances, and point of purchase displays. These clear plastics are also used in glazing and for health care and other applications. In many of these applications, it would be useful for the clear plastics to be colored. Examples of clear plastics currently used include general purpose polystyrene (GPPS), clarified polypropylene (PP), polyethylene terephthalate (PET), and polyvinyl chloride (PVC). Engineered plastics may also be suitable, including polycarbonate (PC), polymethylmethacrylate (PMMA), PET modified with CHDM (PETG), copolyesters, thermoplastic polyurethane (TPU), polysulfone, and specialty polyamides.

The majority of clear plastics for applications other than packaging are colored using solid pellet color concentrates and/or pre-colored resins. Color concentrates are formulated with carrier resins that are specific to the plastic being colored to maintain compatibility and clarity. These color concentrates are usually used at high use rates (e.g., about 2-4 weight percent) to achieve good color distribution and produce parts without color swirls or variation. Many of the clear plastics, including PET and PC are processed at high temperatures that cause thermal degradation of colorants and additives during manufacturing. It is often desirable to produce mini-beads to improve color distribution. Mini-beads, however, are produced using an under-water pelletizer and many high temperature plastics are not suited for this process.

Masterbatches of color concentrates are typically used to color plastics. The typical commercial formulation of a masterbatch includes about 10-20% by weight of colorants and about 80-90% by weight of a carrier resin. Unfortunately, larger proportions of colorant cannot be used in known masterbatches due to insufficient dispersion and processing issues. Insufficient dispersion of the colorant particles can lead to a decrease in physical and mechanical properties of the end product, such as tensile strength, flexural modulus, elongation, and impact strength. Additional problems due to insufficient dispersion include thread breakage during spinning and clogging filters of melt spinning equipment. High loadings of colorants and additives in engineering plastics causes processing issues like poor strand strength due to brittleness, poor feeding, screw slippage and incorporation with carrier resins. Accordingly, colorant concentrations have been limited in conventional masterbatches.

Liquid color may used to color PET for packaging applications. Wax-based concentrates also may be used to color PET for packaging applications. These products are not suitable for coloring a wide variety of clear plastics for consumer durable applications and are not widely used.

U.S. Pat. No. 8,252,855 discloses the use of a liquid carrier based on acrylic polymer for many clear engineering polymers. Liquid color, however, is not widely used because of house-keeping issues, shelf stability issues, processing issues, including screw slippage, and because liquid color requires capital investment of dosing equipment.

Clear plastics are characterized by low haze and high transmittance. These properties are important to maintain when adding color to the plastic. Currently dyes and polymer specific color concentrates are used for coloring clear plastics. It is difficult, however, to color clear plastics and produce parts without swirls and color variations. Thus, there remains a need for a color concentrate that can be used to color a wide variety of clear plastics and that allows for increased loading of colorant in the color concentrate.

SUMMARY

The present invention includes a high molecular weight thermoplastic saturated polyester resin as the carrier in a color concentrate. Unlike currently available resin carriers, this high molecular weight thermoplastic saturated polyester resin is compatible with various types of clear plastics and, thus, can be used in a color concentrate for the coloring of many different kinds of plastic products.

The high molecular weight thermoplastic saturated polyester resin facilitates good color dispersion and color saturation during the manufacturing of clear colored plastics. Use of the high molecular weight thermoplastic saturated polyester resin increases the overall moldability of the color concentrate and allows for the production of colored, clear plastics without swirls and color variations.

In addition, use of a color concentrate that includes the high molecular weight thermoplastic saturated polyester resin results in a final product having a low haze measurement (e.g., less than about 20%), while, at the same time, permitting increased loading of the colorant. In some embodiments, the colorant can be in the amount of about up to as much as 50%-80% by weight of the color concentrate.

The high molecular weight thermoplastic also requires at lower processing temperatures (generally about 350° F. to about 450° F.) that allow it to distribute more efficiently to provide better processability and increased throughput than conventional compositions. Unlike with prior art carrier resins, the use of the high molecular weight thermoplastic saturated polyester carrier resin eliminates the requirement for drying of color concentrate. Skipping the drying step requires less energy and operating costs. It also reduces the chance of contamination at the processor.

In an aspect, the invention relates to a high molecular weight thermoplastic saturated polyester resin as a carrier of a color concentrate.

The color concentrate may be used for coloring a clear polymer article and comprises a high molecular weight thermoplastic saturated polyester resin; a dispersant; and at least one colorant. The high molecular weight thermoplastic saturated polyester resin may have a molecular weight of about 10,000 to about 30,000, an intrinsic viscosity of about 0.55 dl/g to about 0.65 dl/g, and a glass transition temperature of between about 50° C. and 80° C.

The high molecular weight thermoplastic saturated polyester resin comprises about 20% by weight to about 99.9% by weight and the at least one colorant comprises about 0.1% to about 60% by weight.

In another aspect, the invention comprises a method of forming a clear polymer article comprising a color concentrate by mixing a high molecular weight thermoplastic saturated polyester resin, a dispersant, and at least one colorant; and mixing the color concentrate with a melt-processible polymer selected from PC, PMMA, PET, PETG, copolyester, TPU, polysulfone, and specialty polyamides. The solid color concentrate may comprise about 0.10% to about 2.0% by weight of the melt-processible polymer.

DETAILED DESCRIPTION

One aspect of the invention relates to a high molecular weight thermoplastic saturated polyester resin. This high molecular weight thermoplastic saturated polyester resin may be used as a carrier for color concentrates for imparting color to various types of plastics. The high molecular weight thermoplastic saturated polyester resin may be used in colored clear plastics.

The terms "high molecular weight thermoplastic saturated polyester resin," "thermoplastic saturated polyester resin," and "polyester resin" are used interchangeably to refer to the high molecular weight thermoplastic saturated polyester resin of the invention.

The polyester resin may be a component of a color concentrate. The color concentrate may include: (i) the high molecular weight thermoplastic saturated polyester resin; (ii) a dispersant; and (iii) at least one colorant (e.g., dye and/or pigment).

The high molecular weight thermoplastic saturated polyester resin may have a molecular weight of at least 10,000 or it may have a molecular weight ranging from about 10,000 to about 30,000 or from about 15,000 to about 25,000. A high molecular weight increases the temperature at which the product will melt and increases the viscosity of the product. A melting temperature that is too low and/or a viscosity that is too low can cause problems during storage and cause problems during processing, such as screw slippage.

The high molecular weight thermoplastic saturated polyester resin has a glass transition temperature between about 50° C. and about 80° C. and an intrinsic viscosity of about 0.55 to about 0.65 dl/g.

The amount of the high molecular weight thermoplastic saturated polyester resin in the color concentrate may be in the range of about 20% to about 99.9%.

Suitable dispersants for use in the color concentrate include, but are not limited to montan ester waxes, castor-wax powder and ethylene bis stearamide (EBS) powder. The dispersant may comprise up to 8% by weight of the color concentrate. The amount of dispersant in the color concentrate is in the range of about 1% to about 8% by weight, by weight; about 1% to about 5%; about 1% to about 4% by weight, or about 1% to about 3% by weight.

Colorants for use in the color concentrate include, but are not limited to, dyes, pigments, and special effects. Suitable colorants may include, but are not limited to, Solvent Blue 104, Solvent Violet 36, Solvent Red 135, Pigment Red 187, Solvent Red 195, SR 135 dye, Solvent Yellow 93, Solvent Orange 60, Solvent Red 179, Solvent Violet 13, Solvent Green 3, Solvent Green 28, or a combination of two or more thereof.

The colorant may be present in an amount of up to about 80%; about 75%; about 70%; about 65%; or about 60% by weight of the color concentrate. In one embodiment, the colorant is present in the amount of about 0.1% to about 75% by weight; about 0.1% to about 70% by weight; about 0.1% to about 65% by weight; about 0.1 to about 60% by weight; 0.1% to about 50% by weight; about 0.1% to about 45% by weight, or about 0.1% to about 40% by weight.

The colorant may be an organic pigment, inorganic pigment, single pigment dispersion, dye, coated mica, powdered aluminum, optical brightener, fluorescent, and phosphorescent, or a combination of two or more thereof. The colorant may include an organic pigment about 5-50% by weight; or about 10-40% by weight. The colorant may include an inorganic pigment about 0-60% by weight. Further, the colorant may include an organic pigment about 3-40% by weight and an inorganic pigment about 10-80% by weight.

The high molecular weight thermoplastic saturated polyester resin has many benefits over currently available carriers for color concentrates. For example, the resin permits high loadings of pigments and additives, has a low softening point that allows for incorporation into many other resins; is compatible with many clear resins and does not affect the clarity of the clear resin, has low extrusion temperatures (about 380-400° F.), can be processed in underwater pelletizer to facilitate the production of small beads of concentrates; imparts good color distribution and incorporation during molding; is heat stable when molded at relatively high temperatures (about 550° F.-600° F.) with resins such as PET and PC; does not cause screw slippage issues like liquid color and wax-based products, and has a long shelf-life (e.g., more than about 5 years).

When manufacturing a clear, colored plastic, it is important to maintain the clarity of the plastic even after adding color. The appearance of clear plastic is gauged by the cloudiness or haziness of the material to determine visibility. Haze is the only true measurement of clear color and can be quantified and monitored through various means such as that described in the ASTM D 1003. A low haze measurement indicates a high degree of clarity.

The haze measurement of the resulting clear plastic product is preferably less than about 20%. In one embodiment, the haze measurement is less than about 15%, less than about 10%, or even less than about 8%. Use of a carrier resin with an incompatible polymer will result in an increase in the haze measurement. A product having a haze measurement of greater than about 20% is not considered to have a high degree of clarity and may indicate that the resin in the color concentrate is not compatible with the clear polymer.

The high molecular weight thermoplastic saturated polyester resin may be used as a carrier for color concentrate for a wide variety of clear polymers. Suitable clear polymers include, but are not limited to PC, PMMA, PET, PETG, copolyester, TPU, polysulfone, and specialty polyamides.

The color concentrate including the high molecular weight thermoplastic saturated polyester resin may be used in an amount of about 0.10% to about 2% by weight in the processing of the clear polymer. The amount to be used may vary depending on the desired saturation of the resulting color, the colorant used, and the clear polymer used.

In another aspect of the invention, the high molecular weight thermoplastic saturated polyester resin may be used to create a masterbatch. The formation of the masterbatch may include mixing the high molecular weight thermoplastic saturated resin, a colorant, an additive, and optionally a metallocene polymer processing aid. A masterbatch is a granular, dust-free concentrate of a plastomeric or elastomeric polymer comprising a fraction of a colorant.

The masterbatch composition may be produced by using a split stream feed, which includes a main or primary feed having a colorant, a polymer processing aid, and optionally an additive and carrier resin, and a secondary feed including a majority of the high molecular weight thermoplastic saturated polyester resin in a molten state either connected to the same feed as the primary feed, upstream the primary feed, downstream of the primary feed, or a combination thereof. The primary feed is largely composed of colorants, pigments, powdered resins, processing aids, and functional additives such as UV, AO, slip, antistats, anti-microbial, FR, etc. The primary feed may be a powder feed, a colorant mix feed, and/or a small granule feed.

In a further aspect, the present disclosure is directed to a process for making a colorized clear polymer that includes introducing the color concentrate to a melt-processible polymer to form a melt feed polymer composition, and extruding the polymer composition to form the colorized clear polymer.

In an embodiment, a process for making a well-dispersed masterbatch composition from a split stream process comprises the following steps: a) mixing a colorant in a mixture in a primary feed; b) pre-melting the high molecular weight thermoplastic saturated polyester resin in a secondary feed; and c) combining the mixture of the primary feed and the melted high molecular weight thermoplastic saturated polyester resin of the secondary feed to form the masterbatch composition. Using the masterbatch composition from this process, a thermoplastic article may be produced.

In an embodiment, the mixing step includes an additive in the primary feed, the secondary feed, or a combination thereof.

An additive may be selected from the group consisting of antioxidants, ultraviolet light absorbers, light stabilizers, flame-retardants, antibacterial agents, surface tension reducers, deodorizing agents, anti-static agents, anti-blocking agents, plasticizer agents, fillers, and blowing agents.

The additive may further include an antioxidant of about 0-15% by weight, a light stabilizer about 0-45% by weight, and an ultraviolet light absorber about 0-45% by weight. In an embodiment, the additive is about 5-60% by weight.

The process may further include a dispersion package. In an embodiment, a dispersion package is selected from the group consisting of waxes, coupling agents, and surfactants. The dispersion package may be about 2-8% by weight. The process may further include one of the following: flame-retardants, antibacterial agents, surface tension reducers, deodorizing agents, anti-static agents, anti-blocking agents, plasticizer agents, fillers, and blowing agents.

EXAMPLES

The following examples were prepared in accordance with the invention and are intended to illustrate the invention without limiting it.

Example 1

The high molecular weight thermoplastic saturated polyester resin was added to PC, PET, a copolyester (Tritan™), and PETG and molded into color plaques. The blend molded very well and the resulting plaques were clear. Haze percentage was measured using ASTM D 1003 using a Hunter color spectrophotometer in transmittance mode. Haze measurements were taken for each of the clear plastics (i.e., PC, PET, a copolyester (Tritan™), or PETG). Haze measurements were then taken of a blend of the clear plastic with 0.5 weight percent of the polyester resin. The results are reported below in Table 1a:

TABLE 1a

| Material | Haze % |
| --- | --- |
| PC natural | 3.26 |
| PC w/0.5% polyester resin | 1.51 |
| PET natural | 4.71 |
| PET w/0.5% polyester resin | 3.26 |
| Tritan ™ natural | 3.02 |
| Tritan ™ w/0.5% polyester resin | 2.98 |
| PETG natural | 6.80 |
| PETG w/0.5% polyester resin | 4.12 |

Addition of 0.5% polyester resin to the clear plastic polymer did not impair the haze over the clear plastic alone. This indicates that the polyester resin how good moldability and incorporates well into the polymer matrix.

Haze measurements were then taken of a blend of the clear plastic with 2.0 weight percent of the polyester resin. This amount of polyester resin also did not impair the haze of the clear plastic alone. The results are reported below in Table 1b:

TABLE 1b

| Material | Haze % |
| --- | --- |
| PET natural | 4.71 |
| PET w/2.0% polyester resin | 4.63 |
| Tritan ™ w/2.0% polyester resin | 1.30 |
| PC w/2% polyester resin | 3.97 |
| PETG w/2.0% polyester resin | 3.28 |

Example 2

A transparent blue concentrate using the following formula was compounded using the following formula:

| | |
| --- | --- |
| Solvent Blue 104 | 0.75% by weight |
| Solvent Violet 36 | 0.75% by weight |
| EBS powder (dispersant) | 1.0% by weight |
| Thermoplastic saturated polyester resin | 97.5% by weight |

1% by weight of the resulting color concentrate was molded into each of PC, PET, a copolyester (Tritan™) and PETG to form color plaques. The resulting color plaques were clear and had good color incorporation. Haze percentage values are reported on the Table 2, below:

TABLE 2

| Material | Haze % |
| --- | --- |
| PC w/1% blue concentrate | 2.13 |
| PET w/1% blue concentrate | 3.53 |
| Tritan w/1% blue concentrate | 2.77 |
| PETG w/1% blue concentrate | 4.69 |

Addition of 1% by weight color concentrate shows low haze measurements, especially when compared to the clear plastic polymer alone. (See Table 1, above.)

Example 3

A transparent pink concentrate was compounded using the following formula:

| | |
|---|---|
| Solvent Red 135 | 0.11% by weight |
| Pigment Red 187 | 0.02% by weight |
| Solvent Red 195 | 0.03% by weight |
| EBS powder | 1.0% by weight |
| Thermoplastic saturated polyester resin | 98.84% by weight |

2% by weight of the resulting color concentrate was molded into each of PC, PET, a copolyester (Tritan™) and PETG by adding 2% to form a color plaque. The resulting color plaques were clear and had good color incorporation. Haze percentage values are reported in Table 3, below:

TABLE 3

| Material | Haze % |
|---|---|
| PC w/2% pink concentrate | 2.92 |
| PET w/2% pink concentrate | 4.50 |
| Tritan w/2% pink concentrate | 4.09 |
| PETG w/2% pink concentrate | 6.90 |

Addition of 2% by weight color concentrate shows low haze measurements.

Example 4

Color concentrates were prepared with a high loading of colorant as shown in the below formulae.

White Color Concentrate

| | |
|---|---|
| TiO$_2$ | 75% by weight |
| Castor wax | 3% by weight |
| Thermoplastic saturated polyester resin | 22% by weight |

Blue Color Concentrate

| | |
|---|---|
| Solvent Blue 104 | 45% by weight |
| Castor wax | 3% by weight |
| Thermoplastic saturated polyester resin | 52% by weight |

Red Color Concentrate

| | |
|---|---|
| Solvent Red 135 | 40% by weight |
| Castor wax | 3% by weight |
| Thermoplastic saturated polyester resin | 57% by weight |

UV Absorber Color Concentrate

| | |
|---|---|
| Tinuvin 234 | 40% by weight |
| Thermoplastic saturated polyester resin | 60% by weight |

As used herein, approximating language may be applied to modify any quantitative representation that may vary without resulting in a change in the basic function to which it is related. Accordingly, a value modified by a term or terms, such as "about" and "substantially," may not necessarily be limited to the precise value specified.

While the invention has been described with reference to various exemplary embodiments, it will be appreciated that modifications may occur to those skilled in the art, and the present application is intended to cover such modifications and inventions as fall within the spirit of the invention.

What is claimed is:

1. A method of forming a clear polymer article comprising:
   a. forming a solid color concentrate by mixing a high molecular weight thermoplastic saturated polyester resin having a molecular weight of about 10,000 to about 30,000, a dispersant, and at least one colorant; and
   b. mixing the color concentrate with a melt-processible polymer selected from polycarbonate (PC), polymethylmethacrylate (PMMA), polyethylene terephthalate (PET), PET modified with cyclohexanedimethanol (CHDM) polyethylene terephthalate glycol-modified (PETG), copolyester, thermoplastic polyurethane (TPU), polysulfone, specialty polyamides, or a combination of two or more thereof to form a polymeric article having less than 20% haze as determined by ASTM D 1003.

2. The method of claim 1, wherein the color concentrate comprises about 0.10% to about 2.0% by weight of the melt-processible polymer.

3. The method of claim 1, wherein the high molecular weight thermoplastic saturated polyester resin has a molecular weight of about 10,000 to about 30,000.

4. The method of claim 1, wherein the high molecular weight thermoplastic saturated polyester resin has an intrinsic viscosity of about 0.55 dl/g to about 0.65 dl/g.

5. The method of claim 1, wherein the high molecular weight thermoplastic saturated polyester resin has a glass transition temperature of between about 50° C. and 80° C.

6. The method of claim 1, wherein the high molecular weight thermoplastic saturated polyester resin comprises about 20% by weight to about 99.9% by weight and the at least one colorant comprises about 0.1% to about 80% by weight.

7. The method of claim 1, wherein the forming of the color concentrate further includes mixing an additive selected from the group of antioxidants, ultraviolet light absorbers, light stabilizers, flame-retardants, antibacterial agents, surface tension reducers, deodorizing agents, antistatic agents, anti-blocking agents, plasticizer agents, fillers, and blowing agents.

8. The method of claim 7, wherein the additive is present in an amount of about 5-60% by weight.

9. The method of claim 8, wherein the additive includes at least one component selected from a group consisting of: antioxidant, an ultraviolet light absorber, and a light stabilizer and, when present, the component is 0-15% by weight of an antioxidant; 0-45% by weight of an ultraviolet light absorber, and 0-45% by weight of a light stabilizer.

* * * * *